Patented Mar. 21, 1939

2,151,147

UNITED STATES PATENT OFFICE 2,151,147

PROCESS FOR OBTAINING ORGANIC COMPOUNDS FROM THE ACID SLUDGE FROM REFINING OF MINERAL OILS

Waclaw Junosza v. Piotrowski and Jozef Winkler, Drohobycz, Poland

No Drawing. Application October 23, 1937, Serial No. 170,704. In Poland December 2, 1936.

4 Claims. (Cl. 196—148)

The invention relates to a method for recovering useful organic compounds from acid sludge which is a by-product of mineral oil refining processes, and which is generally wasted. Such sludge includes fusible or liquefiable portions which are solid at ordinary temperatures.

In a process which we have previously carried out organic compounds were obtained by refining hydrocarbons first with sulphuric acid, then neutralising with alkalies and heating the product thus obtained to a temperature which lies below the average boiling temperature of the fusible organic compounds contained in the product. The latter are thus caused to melt and separate in fluid form from the infusible inorganic residues.

The above-mentioned process though forming an important contribution towards the utilization of acid sludge from refining treatments has certain disadvantages. Thus, for example, it requires an excess of mineral constituents and consequently much fuel is required for melting out the organic compounds.

The process of the present invention makes it possible to obtain in a simple and economical manner from acid sludge the valuable organic compounds contained therein.

We have discovered that it is advantageous to dissolve the acid sludge, before neutralising them, in a solvent which is itself produced by the process of the invention. It is of course to be understood that when the process is started for the first time another solvent has to be taken, preferably the mixture of hydrocarbons obtained by our own above-mentioned process, according to which acid sludge is neutralised with alkalies whereafter the mass is heated to a temperature below the boiling point of the organic compounds, the latter being fused thereby.

It is, however, possible to use another suitable mixture of organic compounds as a solvent in starting the process according to the invention.

In later stages of the process we always use, however, a portion of the hydrocarbon mixture produced by the process itself, for dissolving fresh portions of acid sludge to be worked up. The acid sludge dissolves without residue in the mixture of organic compounds forming a solvent for them and thus dissolved they are easily neutralised at temperatures above 50° C. by dry powdered calcined lime or dry powdered slaked lime in the absence of water.

Since the acid sludge is present in true solution only as much lime is used for neutralisation, as is necessary stoichiometrically to neutralise the free sulphuric acid and the sulpho acids.

Neutralisation is preferably effected at a temperature of about 120° C., at which the sulpho acids split off the sulpho group. On neutralisation of the dissolved acid sludge two phases are formed, i. e. a fluid phase consisting of the solvent and the dissolved organic compounds from the acid sludge, and a suspension of solid matters, consisting mainly of calcium sulphate. The solid matters settle to the bottom of the neutralisation vessel as a slurry from which the organic liquid can be drawn off practically free from inorganic matters.

By the described neutralisation process there results a relatively small quantity of inorganic salts so that if desired they can be distributed in the organic liquid by mixing. It is also possible to introduce the whole suspension into the distillation vessel without any prior separation of the inorganic matters. The distillation is conducted preferably in such a manner that a light and a heavy fraction are obtained, the first of which containing the used solvent, can be used again to dissolve a fresh portion of acid sludge. The second (main) fraction is a thick resinous liquid being practically a mixture of high molecular unsaturated hydrocarbons which possesses, on account of these contents, valuable technical properties.

Following the neutralisation of the dissolved acid sludge the process can be so operated that a portion thereof is introduced into the distillation vessel, while the rest remains in the agitator where neutralisation takes place and is used for dissolving a fresh portion of acid sludge.

It is not always necessary to distil the neutralised acid sludge. Freed from the aforesaid inorganic matters, they possess also in the crude condition valuable technical properties on account of their high content in unsaturated compounds.

The following example illustrates how the process of the invention may be carried out.

1. About 1000 kilograms of a mixture of organic compounds obtained by neutralising acid sludge and thereafter heating the neutralised mass to a temperature below the boiling point of the organic compounds, the latter being fused thereby, are pumped into an agitator of about 5000 litres capacity which can be heated to about 150° C. and is made of corrosion-resisting material and provided with a slowly rotating stirrer. Into the liquid heated to about 110° C., 1000 kilograms of acid sludge (preferably melted) are added in portions while stirring continuously. After dissolving the temperature is raised to about 120° C. and while continuously stirring 130 kilograms of finely powdered dry calcium hydroxide are added in portions. A violent reaction takes place with evolution of $SO_2$ and steam, these gases being sucked off. As soon as the reaction has slackened the temperature is raised to about 150° C. and the content of the agitator is mixed until the evolutions of gases and steam ceases. The product of reaction is then allowed to settle at 150° C., whereupon the formed $CaSO_4$ sinks to the bottom of the agitator. The liquid after becoming clear is drawn off and the slurry is removed through the lower pipe of the agitator. The dark liquid can be distilled in order to obtain clearer products.

The slurry removed from the bottom of the agitator still contains about 50 per cent. of organic liquid which can be recovered by extraction, filtration or centrifuging in known manner.

About 1000 kilograms of a mixture of organic compounds obtained by the process hereinbefore described are pumped into an agitator having a capacity of about 5000 litres, made of corrosion-resisting material. Then the content of the vessel is heated to 110° C. and while stirring continuously 1000 kilograms of melted acid sludge from the refining of lubricating oil are added in portions. When the acid sludge has dissolved the liquid is heated to 120° C. and while stirring continuously 150 kilograms of finely powdered burnt magnesite are gradually added in portions.

The neutralisation of the acid liquid occurs with the evolution of $SO_2$ and steam. As soon as the reaction is over the vessel is closed and heated. Distillation follows under a vacuum of about 50 millimetres of mercury. The first fraction is collected until the temperature of the vessel content has reached 280° C. This fraction is a waterfree oily liquid having a specific gravity of about 0.980 and characteristic smell which can be used again for dissolving fresh acid sludge.

The second fraction is a very viscous resinous liquid green in reflected light and red in transparent light having a specific gravity above 1.0 (about 1.05) and pronounced unsaturated character (iodine value 90–100). This fraction is collected until the temperature of the vessel content reaches a temperature of 360° C. The yield of the main fraction is about 50 per cent. by weight calculated on the quantity of acid sludge used.

One hour after the distillation has finished and at a temperature of 350° C. the residue is drawn off from the vessel. This residue (about 25 per cent. calculated on the charge) is an asphalt having a softening point above 200° C. which contains about 45 per cent. of inorganic constituents (mainly $CaSO_4$) and about 55 per cent. of bitumen soluble in carbon bisulphide.

If the distillation is continued to an oil temperature over 380° C., the output of the main fraction is increased to about 60 per cent. and a coke-like residue remains in the vessel which must be mechanically removed from the latter.

The above description is not to be taken as limiting, but merely as illustrative of two modes of carrying out our process, but many variations may be made by a man skilled in the art within the scope of the following claims.

What we claim is:

1. A process for obtaining organic compounds from the acid sludge from refining of mineral oils comprising the steps of dissolving the said acid sludge in a mixture of high boiling organic compounds obtained in an earlier stage of the process itself, neutralising the resultant solution with dry powdered lime and then distilling the said neutralised acid sludge together with the inorganic matter formed by the neutralisation, and utilizing a portion of the distillate to dissolve fresh portions of acid sludge in a subsequent stage.

2. A process for obtaining organic compounds from the acid sludge from refining of mineral oils comprising the steps of dissolving the said acid sludge in a mixture of high boiling organic compounds obtained in an earlier stage of the process itself, neutralising the resultant solution with dry powdered lime and then distilling the said neutralised acid sludge after removal of the inorganic matter formed by the neutralisation, and utilizing a portion of the distillate to dissolve fresh portions of acid sludge in a subsequent stage.

3. A process as claimed in claim 1, wherein the dissolution, neutralisation and distillation steps are carried out in one and the same vessel.

4. A process as claimed in claim 2, wherein the dissolution, neutralisation and distillation steps are carried out in one and the same vessel.

JOZEF WINKLER.
WACLAW JUNOSZA v. PIOTROWSKI.